(12) United States Patent
Park

(10) Patent No.: US 12,144,290 B1
(45) Date of Patent: Nov. 19, 2024

(54) AIR DOME SMART FARM

(71) Applicant: MIDBAR, INC., Pohang-si (KR)

(72) Inventor: Hae Young Park, Anyang-si (KR)

(73) Assignee: MIDBAR, INC., Pohang-si (KR)

( * ) Notice: Subject to any disclaimer, the term of this patent is extended or adjusted under 35 U.S.C. 154(b) by 0 days.

(21) Appl. No.: 18/654,065

(22) Filed: May 3, 2024

Related U.S. Application Data

(63) Continuation of application No. PCT/KR2022/002827, filed on Feb. 25, 2022.

(30) Foreign Application Priority Data

Dec. 22, 2021 (KR) .................. 10-2021-0185175

(51) Int. Cl.
*A01G 13/02* (2006.01)
*A01G 31/02* (2006.01)

(52) U.S. Cl.
CPC ......... *A01G 13/0206* (2013.01); *A01G 31/02* (2013.01)

(58) Field of Classification Search
CPC ...... A01G 13/02; A01G 31/02; A01G 9/1469; A01G 9/247; A01G 13/0206; A01G 13/0212; A01G 13/0231; A01G 13/0243; A01G 13/04; A01G 2031/006; A01G 9/14; A01G 9/1415; A01G 9/1438; A01G 9/24
See application file for complete search history.

(56) References Cited

FOREIGN PATENT DOCUMENTS

| JP | 03-035724 | A | | 2/1991 |
|----|-----------|---|---|--------|
| JP | 2009-219456 | A | | 10/2009 |
| KR | 20-1990-0003900 | Y1 | | 5/1990 |
| KR | 20-2012-0005197 | U | | 7/2012 |
| KR | 10-2014-0076746 | A | | 6/2014 |
| KR | 10-1455166 | B1 | | 10/2014 |
| KR | 10-1473934 | B1 | | 12/2014 |
| KR | 10-2016-0096336 | A | | 8/2016 |
| KR | 10-2016-0115271 | A | | 10/2016 |
| KR | 10-2017-0001282 | A | | 1/2017 |
| KR | 10-2017-0091339 | A | | 8/2017 |
| KR | 20170121408 | A | * | 11/2017 |
| KR | 10-2020-0025004 | A | | 3/2020 |
| KR | 102248358 | B1 | * | 5/2021 |
| KR | 20220140138 | A | * | 10/2022 |

(Continued)

OTHER PUBLICATIONS

International Search Report of PCT/KR2022/002827, issued on Jul. 25, 2022.

(Continued)

*Primary Examiner* — Trinh T Nguyen
(74) *Attorney, Agent, or Firm* — NKL Law; Byungwoong Park

(57) ABSTRACT

The present invention relates to an air dome smart farm. The present invention comprises an air dome roof including an outer film and inner film in a dome shape, an air column disposed inside the air dome roof and supporting an air cultivation bed, and the air cultivation bed disposed under the air column and including multiple perforation portions to enable plant cultivation, wherein the air dome roof, the air column, and the air cultivation bed are connected to each other to allow air to pass therebetween, and thus when air is injected therein, an air dome is integrally formed.

6 Claims, 7 Drawing Sheets

(56) References Cited

FOREIGN PATENT DOCUMENTS

| | | | |
|---|---|---|---|
| KR | 102627230 B1 | * | 1/2024 |
| KR | 20240027958 A | * | 3/2024 |

OTHER PUBLICATIONS

Office Action of KIPO for Korean application No. 10-2021-0185175, issued on Jan. 17, 2024.
Notice of Allowance Action of KIPO for Korean application No. 10-2021-0185175, issued on Feb. 19, 2024.

* cited by examiner

AIR DOME SMART FARM

TECHNICAL FIELD

The present disclosure relates to an air dome smart farm, and particularly, an air dome smart farm in which an air dome roof is provided to be integrated with an air cultivation bed for plant cultivation and an air dome can be maintained at an appropriate temperature through water circulation using geothermal heat.

BACKGROUND ART

In general, when constructing a fixed structure, pillars that can support the building are erected on top of a basic structure and beams are connected to construct the structure. However, these fixed structures have the problem of taking a long time to build.

Air domes do not require a separate frame, and the structure is maintained by air pressure, so they are often used in cases where facilities are needed quickly, such as in emergency medical centers. In addition, as the number of climate disaster areas is increasing due to climate change due to global warming, the use of the air dome in agricultural production facilities that can be used as an emergency in areas where agricultural production is impossible due to floods or droughts is being requested.

However, the conventional air dome has the problem of having to install separate cooling and heating equipment such as an air conditioner or heater for cooling and heating, and has the problem of having to reinstall separate equipment within the air dome.

As a prior art, there is Korean Patent Publication No. 10-2020-0025004 (air dome type greenhouse), which only discloses an awning and a snow removal portion installed to prevent collapse and damage due to snow load by moving the snow accumulated outside in a downward direction under control while blocking direct sunlight from the sun at an upper portion of an air dome.

SUMMARY

Technical Problems

In order to solve the above-mentioned problems, an object of the present disclosure is to provide an air dome smart farm in which the air dome roof constituting an air dome is integrated with the air cultivation bed for plant cultivation to enable plant cultivation without installing separate equipment and the inside of the air dome can be maintained at an appropriate temperature through water circulation using geothermal heat.

The problems solved in the present disclosure are not limited to those mentioned above, and other problems not mentioned can be clearly understood by those skilled in the art from the description below.

Technical Solution

As a means to solve the above-mentioned technical challenges, according to one embodiment of the present disclosure, there is provided an air dome smart farm including: an air dome roof including an outer film and inner film in a dome shape; an air column disposed inside the air dome roof and supporting an air cultivation bed; and the air cultivation bed disposed under the air column and including multiple perforation portions to enable plant cultivation, in which the air dome roof, the air column, and the air cultivation bed are connected to each other to allow air to pass therebetween, and thus when air is injected therein, an air dome is integrally formed.

The air dome smart further includes a water tank disposed to be buried in a ground at a lower portion of the air dome roof; a geothermal exchange device disposed at a lower portion of the water tank and exchanging heat to enable circulation of water in the water tank using geothermal heat. The geothermal exchange device includes a valve to enable circulation from a water tank storing a PCM material such as water to the geothermal exchange device.

Mist is provided from the water tank by applying an aeroponic method to form a water film to control temperature between the inner film and outer film of the air dome column.

The air cultivation bed is provided with the multiple perforation portions on an upper surface thereof, allowing cultivation by placing plants within the perforation portions, and the air cultivation bed is provided with a single perforation portion on a side surface so that air is introduced therethrough.

Water circulation is possible from the water tank to the entire air dome column by placing a water circulation pipe between the inner film and outer film of the air dome column.

Effect of Invention

According to the present disclosure, the air dome roof and the air cultivation bed are integrated so that an air dome smart farm can be implemented just by injecting air without the need to install separate equipment inside.

In addition, it is possible to maintain the air dome smart farm at an appropriate temperature by forming the water film or by placing the water circulation pipe between the inner film and outer film of the air dome roof. It is possible to implement a passive farm that minimizes artificial energy by utilizing daily and seasonal temperature differences using geothermal heat. In addition, it is easy to install and dismantle the air dome smart farm, and the air dome smart farm can be reused after disassembly.

The effects of the present disclosure are not limited to those mentioned above, and other effects not mentioned will be clearly understood by those skilled in the art from the description below.

DETAILED DESCRIPTION OF EXEMPLARY EMBODIMENTS

Figure 1:
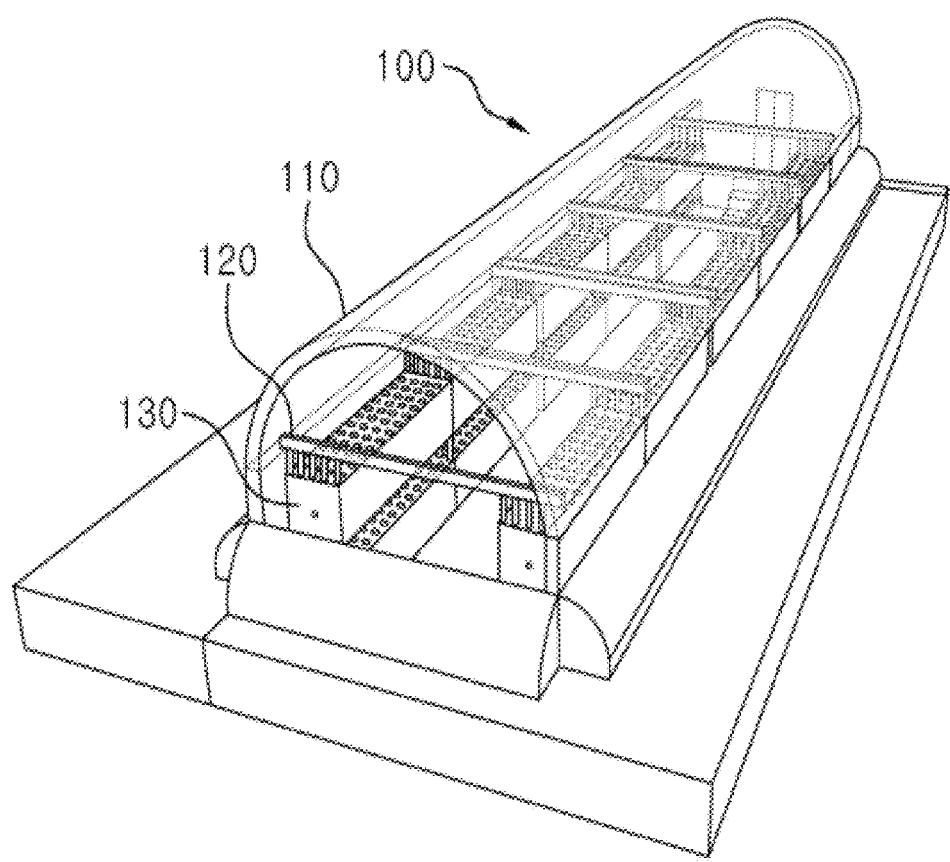
FIG. 1 is a perspective view illustrating an air dome smart farm according to one embodiment of the present disclosure.

Specific structural or functional descriptions of the embodiments according to the concept of the present disclosure disclosed in the present specification are merely illustrative for the purpose of explaining the embodiments according to the concept of the present disclosure, and embodiments according to the concept of the present disclosure may be implemented in various forms and are not limited to the embodiments described in the present specification.

Since the embodiments according to the concept of the present disclosure can make various changes and have various forms, the embodiments will be illustrated in the drawings and described in detail in the present specification. However, this is not intended to limit the embodiments according to the concept of the present disclosure to specific disclosure forms, and includes all changes, equivalents, or substitutes included in the idea and technical scope of the present disclosure.

The terms used in the present specification are merely used to describe specific embodiments and are not intended to limit the present disclosure. Singular expressions include plural expressions unless the context clearly dictates otherwise. In the present specification, terms such as "include" or "have" are intended to designate the presence of features, numbers, steps, operations, components, parts, or combinations thereof described in the present specification, but should be understood to not preclude the presence or addition of one or more other features, numbers, steps, operations, components, parts, or combinations thereof.

Hereinafter, embodiments of the present disclosure will be described in detail with reference to the drawings attached to the present specification.

FIG. 1 is a perspective view explaining an air dome smart farm according to one embodiment of the present disclosure.

Referring to FIG. 1, the air dome smart farm 100 consists of an air dome roof 110, an air column 120, and an air cultivation bed 130. The air dome roof 110 includes an outer film and an inner film in a dome shape.

The air column 120 is connected to the air dome roof 110 and is placed inside the air dome roof. The air column 120 is disposed inside the air dome and includes a first air column disposed laterally and a second air column disposed perpendicular to the first air column. Multiple second air columns are placed in the first air column. The multiple second air columns are connected to the air cultivation bed and support the air cultivation bed. The air cultivation bed 130 has multiple perforation portions on an upper surface thereof. A pot for growing plants may be inserted into the perforation portion. In FIG. 1, the air cultivation bed 130 is illustrated to be arranged in two stages through the second air column, but this is not limited.

In the present disclosure, the air dome roof 110, air column 120, and air cultivation bed 130 are connected to each other to allow air to pass therebetween. Therefore, when air is injected therein, an air dome may be integrally formed. Accordingly, the cultivation bed that can grow plants only by injecting air can be provided without installing a separate frame.

Figure 2:
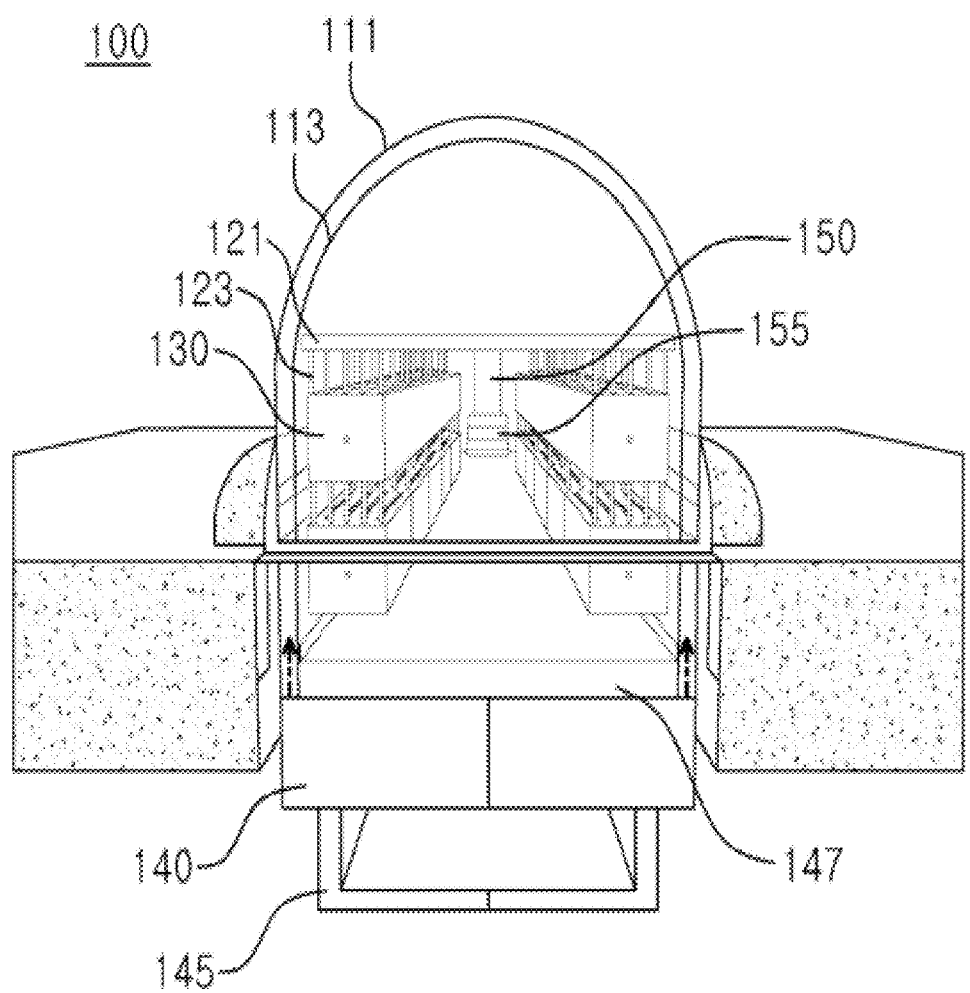
FIG. 2 is a front view illustrating the air dome smart farm according to one embodiment of the present disclosure.

FIG. 2 is a front view illustrating the air dome smart farm according to one embodiment of the present disclosure.

Referring to FIG. 2, the air dome smart farm 100 can be installed lower than a reference ground to utilize geothermal heat. The soil dug up to install the air dome smart farm 100 can be used to create a protective wall around the air dome smart farm to increase the insulation effect. When the air dome smart farm is installed in a cubic or cuboid-shaped indoor space, the shape of the air dome smart farm may be designed to be changed to a cube or cuboid to suit the indoor space.

The air dome roof includes an outer film 111 and an inner film 113, and air may be injected between the outer film 111 and the inner film 113 to form an air dome. By forming a water film between the outer film 111 and the inner film 113, which are filled with air and maintain the structure, the temperature of the air can be raised or lowered using geothermal heat. In other words, mist can be provided from the water tank by applying the aeroponic method to form a water film to control the temperature between the outer film 111 and the inner film 113 of the air dome column. The configuration of providing mist made by granulating water stored in a water tank can be easily performed by a person skilled in the art, so description is omitted. Through this, it is possible to prevent the internal temperature from falling rapidly in the cold winter and from rising rapidly in the hot summer.

The air column 120 includes a first air column 121 and a second air column 123, and multiple second air columns may be vertically connected to the first air column. The air cultivation bed 130 is arranged in two stages and may be supported by the second air column. Depending on an embodiment, the air cultivation bed 130 may be configured in the form of a vertical wall, and the arrangement relationship between the air column and the air cultivation bed is not limited.

Depending on an embodiment, the air dome smart farm may have a water tank 140 and a geothermal exchange device 145 integrated below the air dome roof. In the case of large facilities that are permanently installed, the water tank 140 capable of controlling insulation and heat dissipation may be placed to control the temperature by utilizing daily temperature differences and seasonal temperatures. There is a floor space 147 through which air is injected between a bottom surface of the air dome and the water tank.

The water tank 140 is placed below the air dome roof to be buried in the ground, and the geothermal exchange device 145 is placed below the water tank and uses geothermal heat to exchange heat so that water in the water tank can be circulated. The geothermal exchange device 145 may have a valve arranged to enable circulation from a water tank storing PCM materials such as water to the geothermal exchange device.

The water tank 140 may be designed to be separated into a high-temperature structure and a low-temperature structure so that the high temperature becomes higher and the low temperature becomes lower through a heat pump. By forming a water film through the mist generated in the water tank, the water circulation structure itself can perform a huge heat pump function. When cooling is needed, high-temperature heat can be recovered by circulating cold water into the system, and when heating is needed, low-temperature heat can be recovered by circulating hot water. In other words, in areas where high temperature water such as hot spring water is always available, heating may be provided in the winter and the cold water produced may be used for cooling in the summer by applying a single tank system that stores only water that has been converted to cold water close to 0 degrees through heat exchange. After refrigeration, the water may be used for agricultural purposes, the water tank is empty, and then, the water tank is refilled with the cooling water in winter. One side surface of the air dome smart farm may be equipped with an entrance door 150 and stairs 155 that allow access to the interior.

Figure 3:
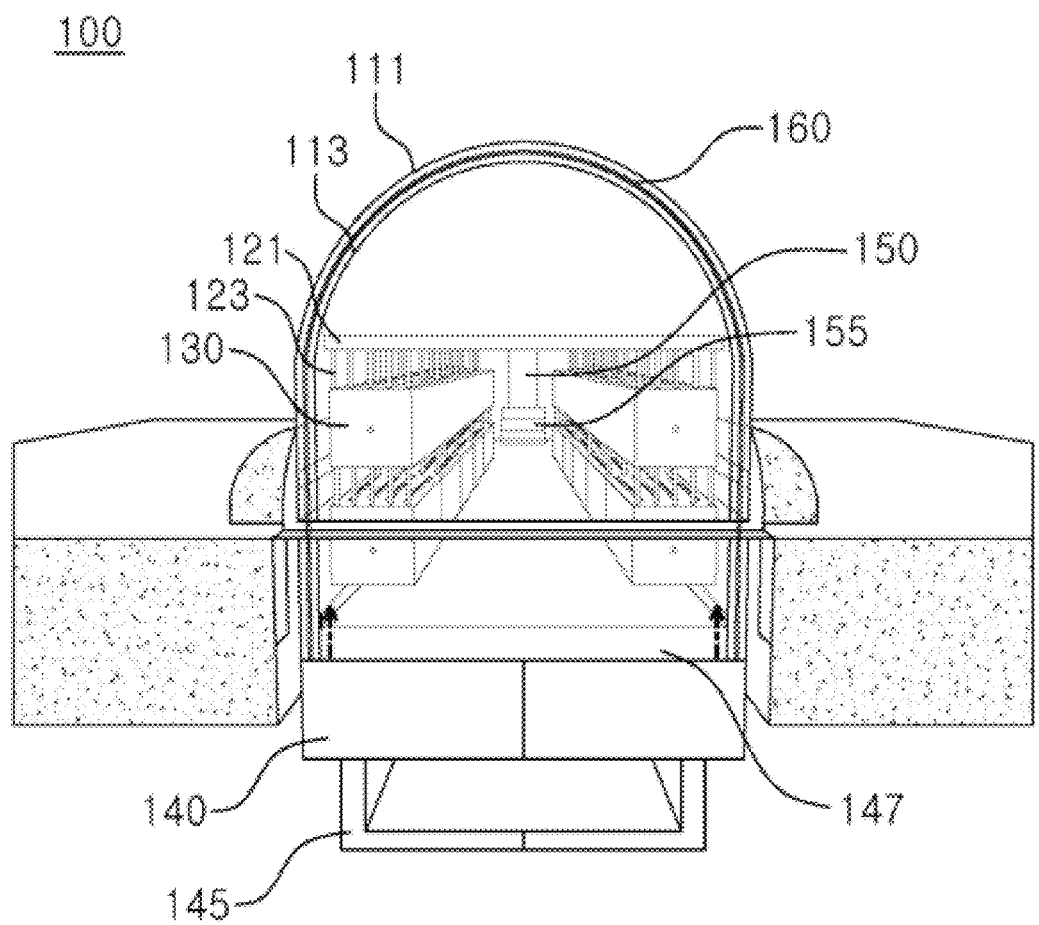
FIG. 3 is a front view illustrating an air dome smart farm according to another embodiment of the present disclosure.

FIG. 3 is a front view illustrating an air dome smart farm according to another embodiment of the present disclosure. Referring to FIG. 3, compared to the embodiment of FIG. 2, a water circulation pipe 160 is further provided between the outer film 111 and the inner film 113 of the air dome roof. Water can be circulated from the water tank to the entire air dome column through the water circulation pipe, and thus, it is possible to maintain the air dome smart farm at an appropriate temperature using the geothermal heat. The configuration that provides for circulating water from the water tank to the water circulation pipe can be easily performed by those skilled in the art, and thus, descriptions thereof are omitted.

Figure 4:
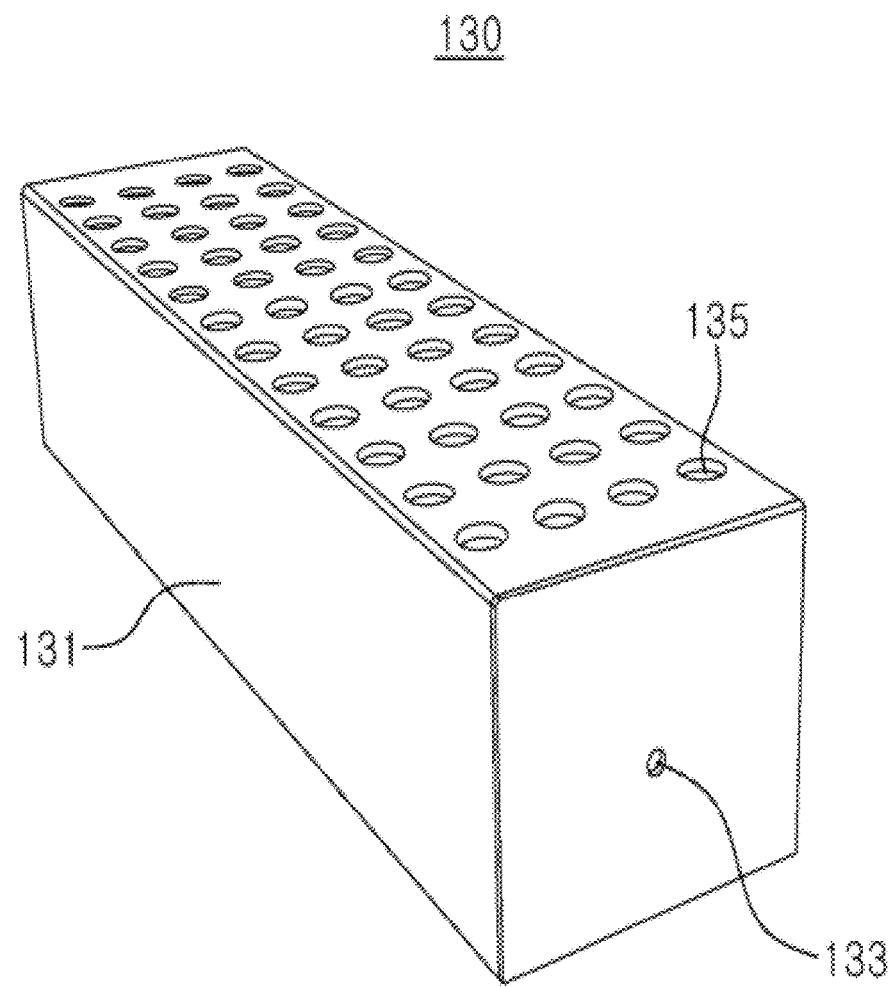
FIGS. 4, 5, 6, 7A, 7B and 7C are views illustrating an air cultivation bed according to one embodiment of the present disclosure.

FIGS. 4 to 7 are views illustrating an air cultivation bed according to one embodiment of the present disclosure. Referring to FIG. 4, the air cultivation bed 130 has a cubic shape, but is not limited thereto. The air cultivation bed 130 is provided with a cube-shaped main body 131 and multiple perforation portions 135 on an upper surface of the main body. A port for growing plants may be inserted into the perforation portion, and a single perforation portion 133 is provided on the side surface of the main body to allow air injection.

Figure 5:
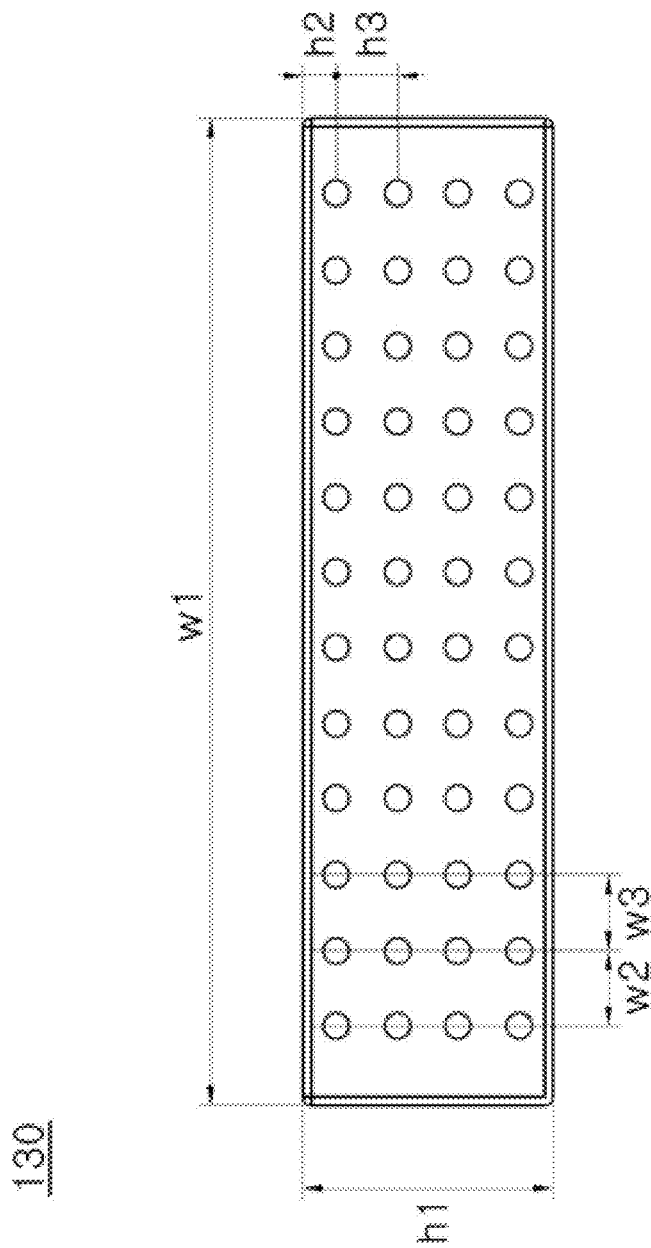
Figure 6:
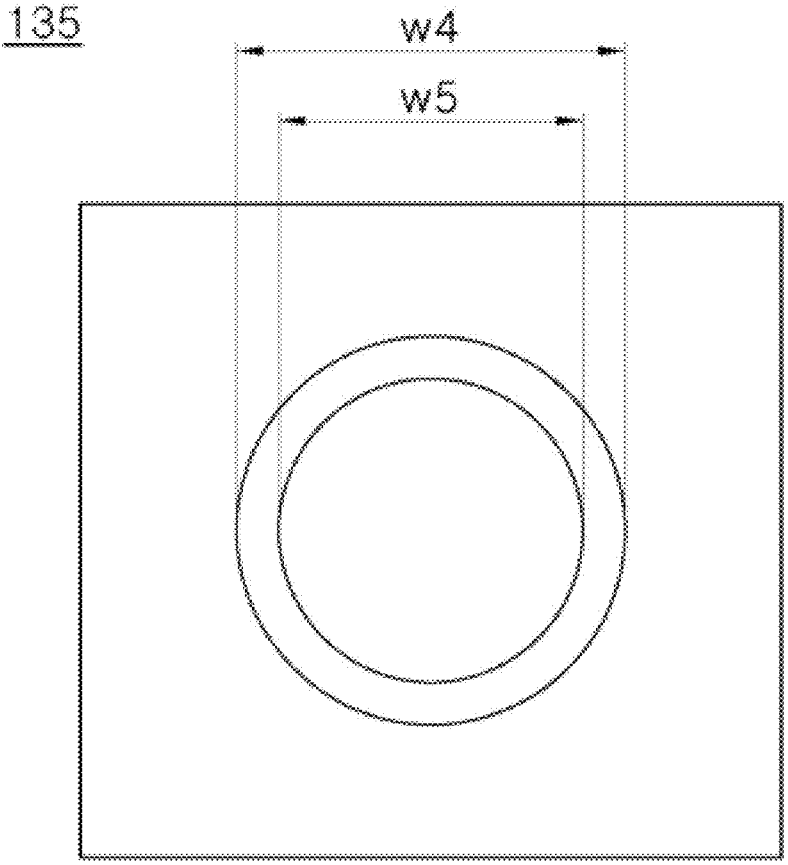

Referring to FIG. 5, a horizontal width W1 of the main body 131 of the air cultivation bed 130 is 1900 mm to 2000 mm, a horizontal width W2 of the perforation portion closest to the side surface of the main body 131 is 140 mm to 2000 mm, and a horizontal width W3 between the perforation portions is 140 mm to 160 mm, but the present disclosure is not limited thereto. A vertical width h1 of the main body 131 is 480 mm to 500 mm, a vertical width h2 of the perforation portion on the upper surface of the main body is 60 mm to 70 mm, and a vertical width h3 between the perforation portions is 110 mm to 130 mm, but the present disclosure is limited thereto.

Figure 7A:
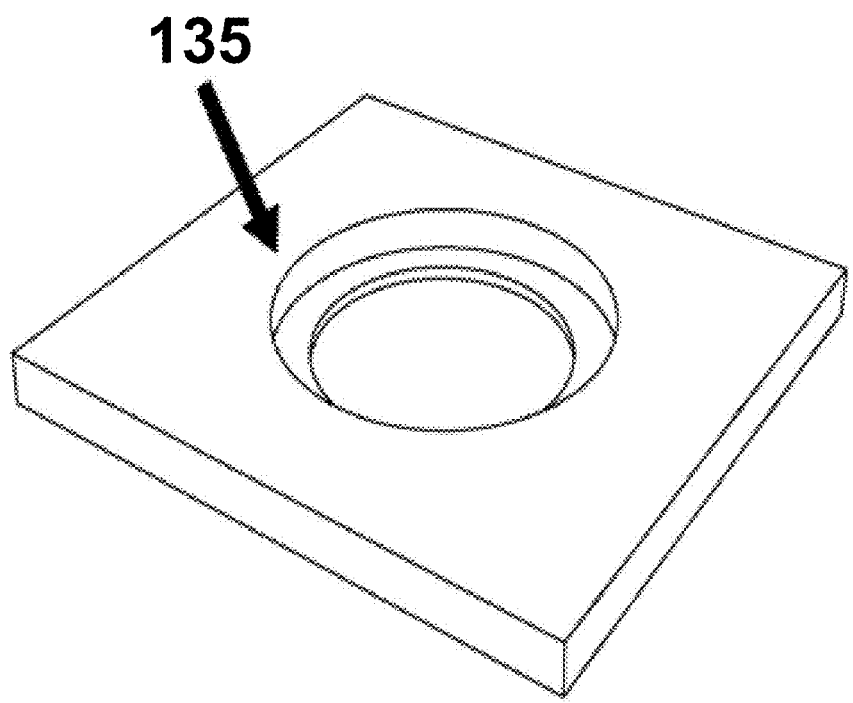
Figure 7B:
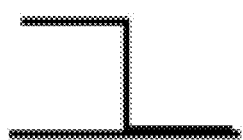
Figure 7C:

Referring to FIGS. 6 and 7A, 7B and 7C, the perforation portion 135 of the air cultivation bed is provided with a stepped portion so that the port can be inserted, and a first outer diameter W4 of the stepped portion is 70 mm, and a second outer diameter W5 is 65 mm thereof, but the present disclosure is limited thereto. The shape of the stepped portion is formed as illustrated in FIG. 7B, and depending on an embodiment, the shape of the stepped portion may be formed as illustrated in FIG. 7C.

Although the invention has been described with reference to the embodiments illustrated in the drawings, this is merely illustrative, and those skilled in the art will understand that various modifications and other equivalent embodiments are possible therefrom. Therefore, the true scope of technical protection of the present disclosure should be determined by the technical idea of the attached registration claims.

What is claimed is:

1. An air dome smart farm comprising:
an air dome roof including an outer film and inner film in a dome shape;
an air column disposed inside the air dome roof and supporting an air cultivation bed; and
the air cultivation bed disposed under the air column and including multiple perforation portions to enable plant cultivation,
wherein the air dome roof, the air column, and the air cultivation bed are connected to each other to allow air to pass therebetween, and thus when air is injected therein, an air dome is integrally formed.

2. The air dome smart farm of claim 1, further comprising:
a water tank disposed to be buried in a ground at a lower portion of the air dome roof, and
a geothermal exchange device disposed at a lower portion of the water tank and exchanging heat to enable circulation of water in the water tank using geothermal heat,
wherein the geothermal exchange device includes a valve to enable circulation from a water tank storing a PCM material such as water to the geothermal exchange device.

3. The air dome smart farm of claim 2, wherein mist is provided from the water tank by applying an aeroponic method to form a water film to control temperature between the inner film and outer film of the air dome column.

4. The air dome smart farm of claim 1, wherein the air cultivation bed is provided with the multiple perforation portions on an upper surface thereof, allowing cultivation by placing plants within the perforation portions, and
the air cultivation bed is provided with a single perforation portion on a side surface so that air is introduced therethrough.

5. The air dome smart farm of claim 1, wherein water circulation is possible from the water tank to the entire air dome column by placing a water circulation pipe between the inner film and outer film of the air dome column.

6. The air dome smart farm of claim 1, wherein when the air dome smart farm is installed in a cubic or cuboid-shaped indoor space, a shape of the air dome smart farm is changed to a cube or cuboid to suit the indoor space.

* * * * *